United States Patent
Leutert

(10) Patent No.: US 7,052,090 B2
(45) Date of Patent: May 30, 2006

(54) ADAPTIVE PNEUMATIC SEAT AND BACKREST CUSHIONS FOR VEHICLES AND AIRPLANES

(75) Inventor: Rudi Leutert, Madiswil (CH)

(73) Assignee: Prospective Concepts AG, Glattbrugg (CH)

( * ) Notice: Subject to any disclaimer, the term of this patent is extended or adjusted under 35 U.S.C. 154(b) by 0 days.

(21) Appl. No.: 10/520,012

(22) PCT Filed: Jan. 15, 2003

(86) PCT No.: PCT/CH03/00017

§ 371 (c)(1),
(2), (4) Date: Jul. 27, 2005

(87) PCT Pub. No.: WO2004/009399

PCT Pub. Date: Jan. 29, 2004

(65) Prior Publication Data

US 2005/0269858 A1    Dec. 8, 2005

(30) Foreign Application Priority Data

Jul. 18, 2002    (DE) ................................ 102 32 625

(51) Int. Cl.
*A47C 7/02*    (2006.01)
(52) U.S. Cl. .............................. 297/452.41; 297/DIG. 3
(58) Field of Classification Search .................... 5/654, 5/655.3, 713; 297/452.41, DIG. 3
See application file for complete search history.

(56) References Cited

U.S. PATENT DOCUMENTS

| | | | | |
|---|---|---|---|---|
| 2,614,272 A * | 10/1952 | Morner | ........................ | 5/655.3 |
| 3,017,642 A * | 1/1962 | Rosenberg et al. | ............. | 5/709 |
| 3,029,109 A * | 4/1962 | Nail | ............................ | 297/461 |
| 3,204,678 A * | 9/1965 | Worcester | ....................... | 383/3 |
| 3,286,285 A * | 11/1966 | Harvey, Jr. | ..................... | 5/711 |
| 3,503,084 A * | 3/1970 | Meinwieser | .................... | 5/630 |
| 3,568,227 A * | 3/1971 | Dunham | ..................... | 5/655.3 |
| 3,813,716 A * | 6/1974 | Francis | ........................... | 5/710 |
| 4,823,417 A * | 4/1989 | Fukuichi | ...................... | 5/655.3 |
| 5,044,030 A * | 9/1991 | Balaton | ......................... | 5/710 |
| 5,687,438 A | 11/1997 | Biggie et al. | | |

FOREIGN PATENT DOCUMENTS

| | | |
|---|---|---|
| DE | 4106862 | 9/1992 |
| FR | 2727066 | 5/1996 |
| GB | 2191690 | 12/1987 |

* cited by examiner

*Primary Examiner*—Milton Nelson, Jr.
(74) *Attorney, Agent, or Firm*—Jenkens & Gilchrist, P.C.

(57) ABSTRACT

An adaptive seat and backrest cushion, divided into a seat cushion and a backrest cushion of essentially the same construction. A number of webs are introduced between an upper skin and a lower skin of an airtight shell by welding or gluing. The first webs are of simple construction, the second webs are of double construction each with a cavity between the webs. The space within the shell is filled with compressed air at a pressure $p_1$, the cavities can be pressurised as required with compressed air at a pressure of $p_2$, where $p_2 > p_1$. The thickness as well as the softness of the seat or backrest cushion can thus be altered.

16 Claims, 5 Drawing Sheets

Fig. 4
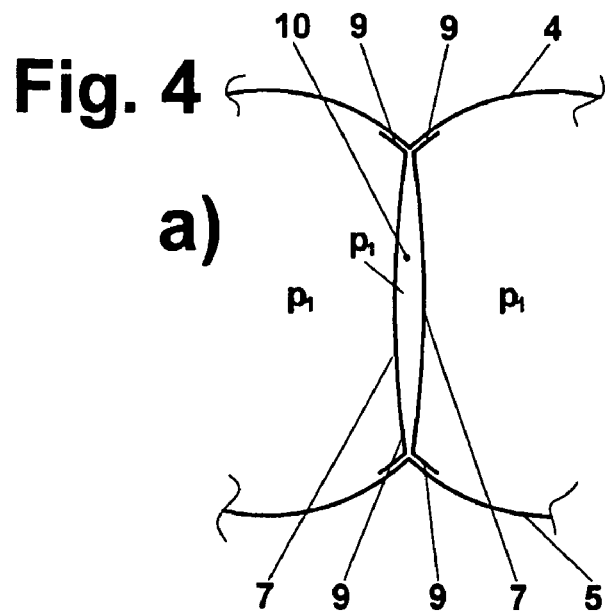 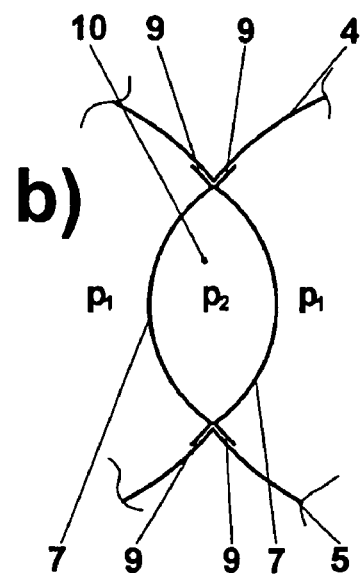
Fig. 5
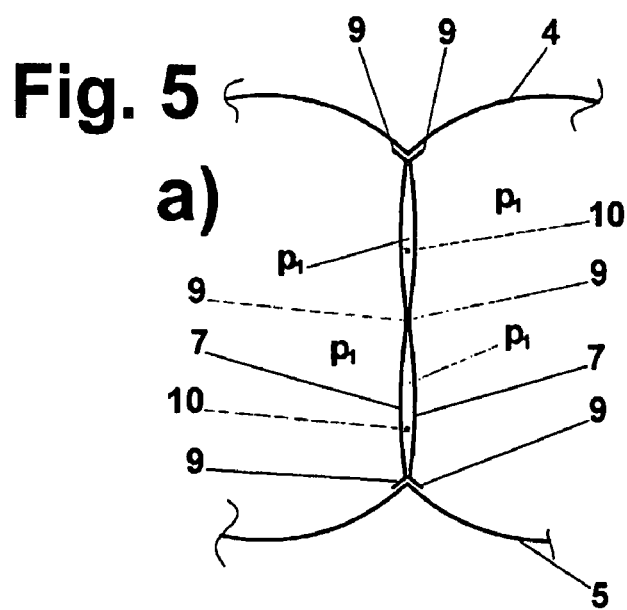 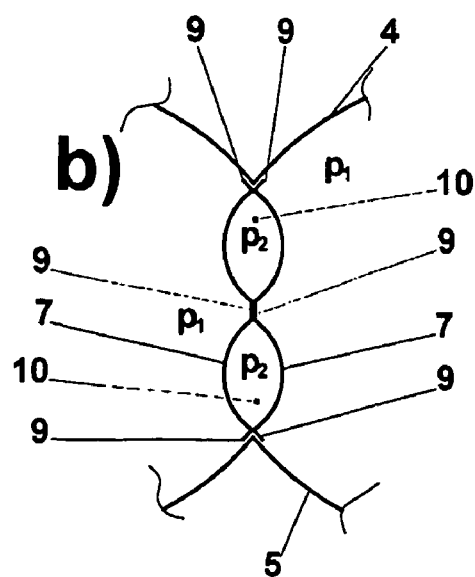

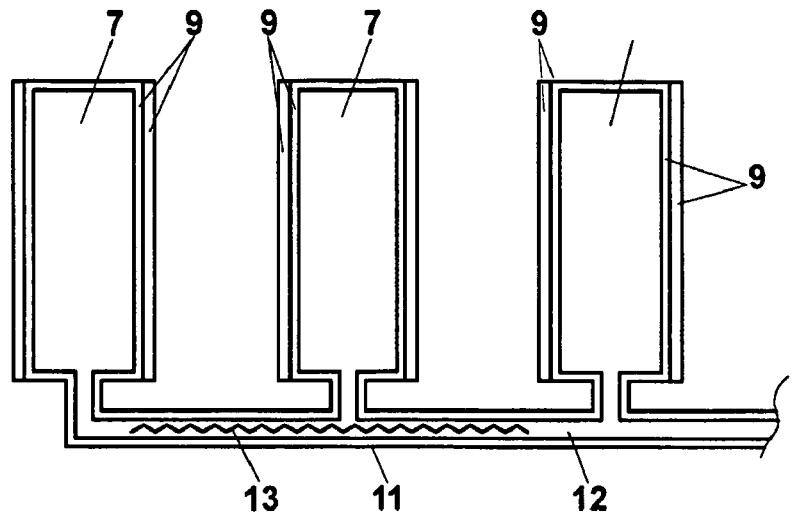
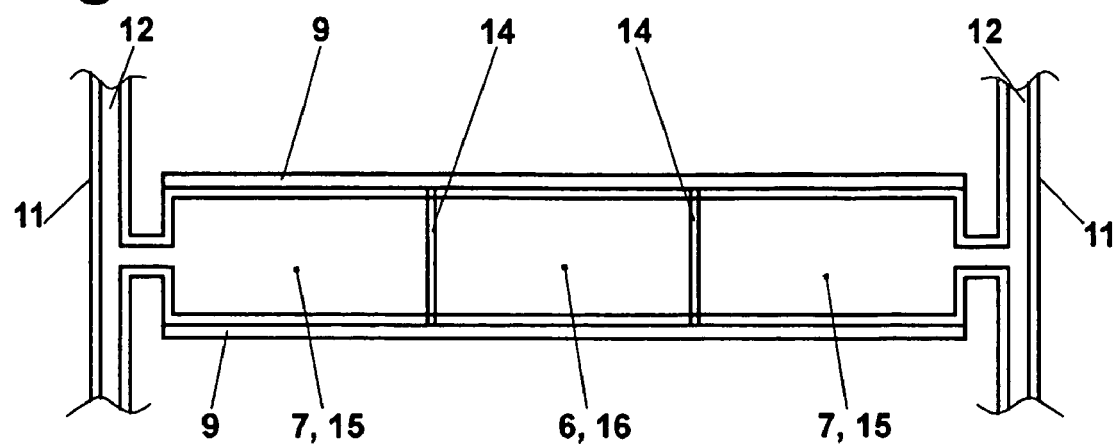

ADAPTIVE PNEUMATIC SEAT AND BACKREST CUSHIONS FOR VEHICLES AND AIRPLANES

The present invention relates to an adaptive pneumatic seat cushion and backrest cushion for vehicles and aeroplanes, according to the precharacterising part of claim 1. Pneumatic seat cushions and backrest cushions are known per se. As a rule they comprise a multitude of air tubes, arranged side by side, which can be aerated and de-aerated by way of a common valve, with the design and construction of such pneumatic seat cushions and backrest cushions being similar to that of known air mattresses. Certain adaptation options consist of having different air pressure settings in individual tubes, as a result of which the shape and softness can be varied to a limited extent. For practical application, such cushions are provided with a textile cover. However, the basic structure of the tubes remains visible and—an essential factor in a cushion—can also be felt.

It is the object of the present invention to create a seat cushion and backrest cushion that is adaptive within a wide range; meets very high requirements in relation to seating comfort; can achieve noticeable weight savings when compared to conventional foam cushions; and during whose manufacture existing seat shell constructions can easily be taken into account.

The object is met by the essential characteristics set out in claim 1, and by further advantageous characteristics set out in the other claims. The invention is explained in more detail with reference to the enclosed drawing.

Figure 1:
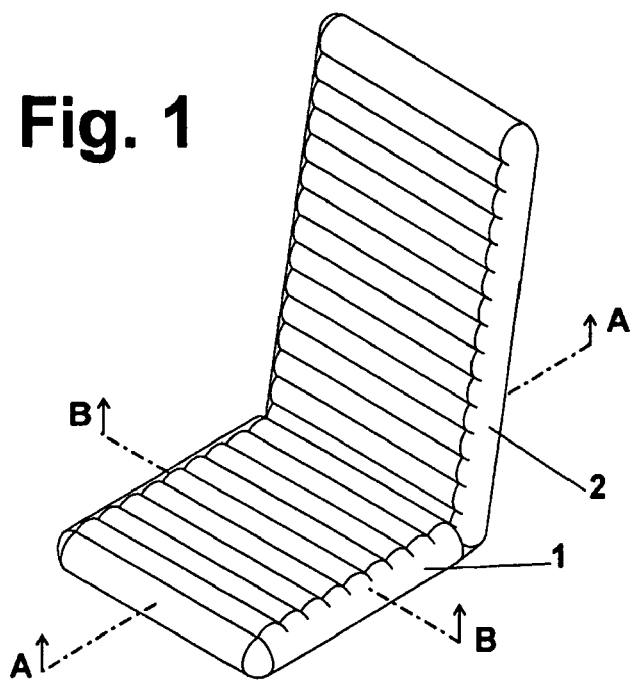
Figure 2:
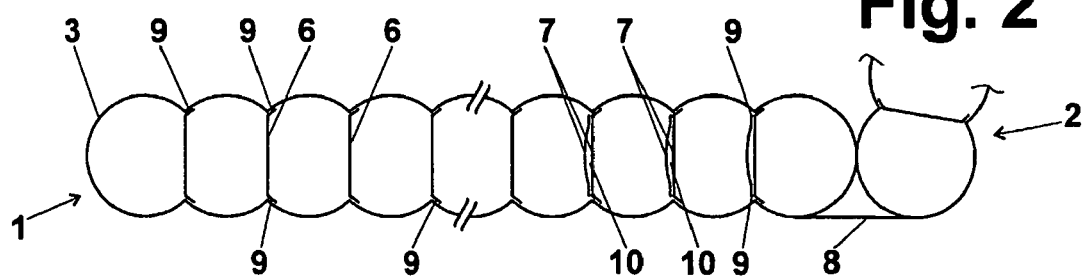

The following are shown:

FIG. 1 a perspective of a first embodiment;

FIG. 2 a longitudinal section of part of the first embodiment;

FIG. 3*a, b* a detail of FIG. 2 in the non-operative state and in the operative state;

FIG. 4*a, b* a variant of FIG. 3*a, b;*

FIG. 5 the same detail as in FIG. 3*a, b* in a second embodiment;

FIG. 6 a production step relating to the detail shown in FIG. 3*a, b;*

Figure 8:
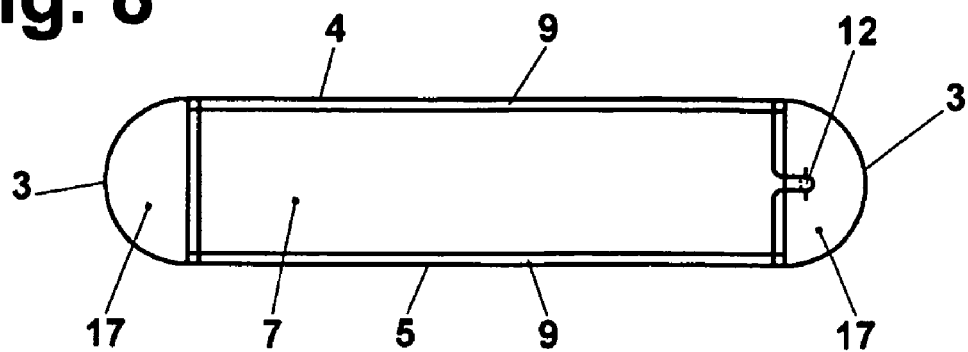
Figure 9:
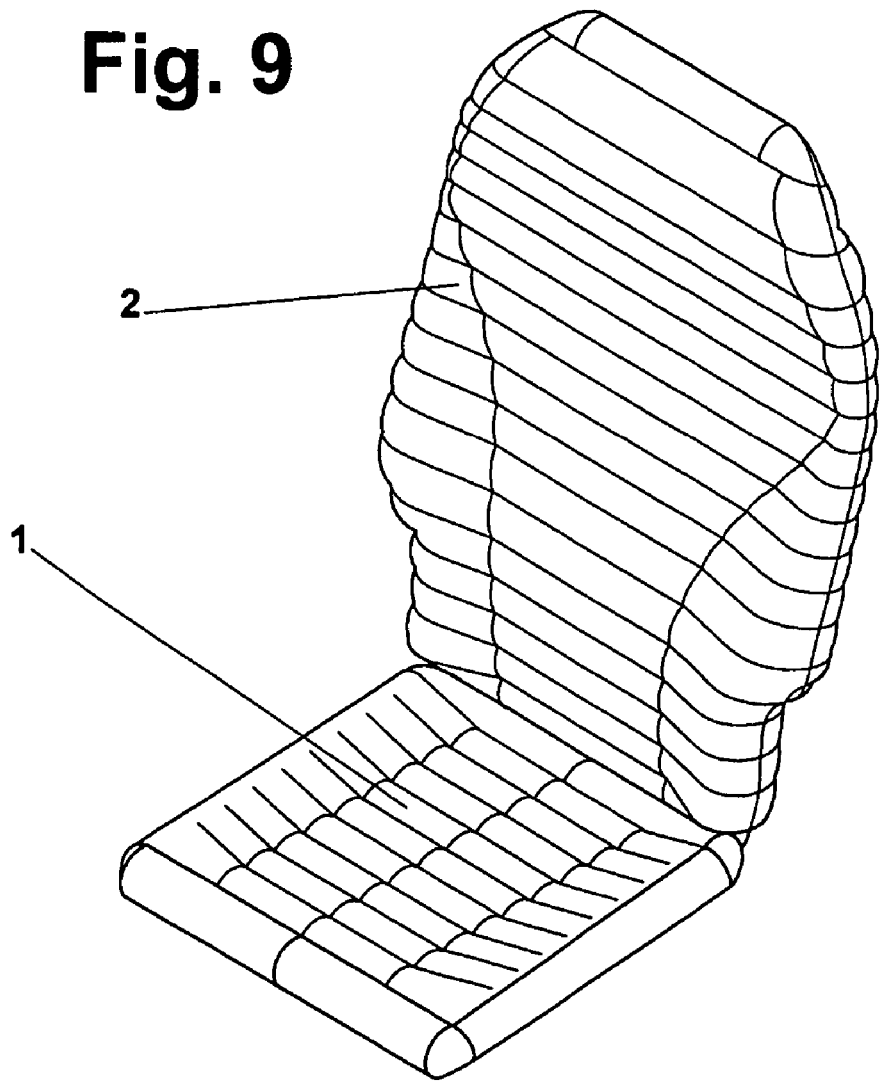
Figure 10:
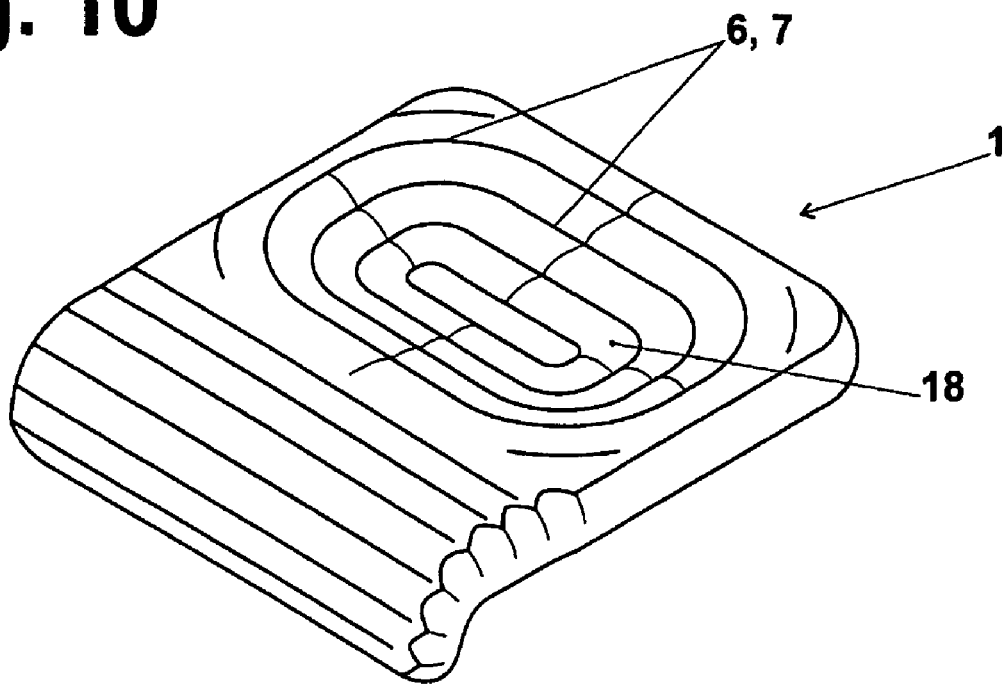

FIG. 7 a division of webs, according to the invention;

FIG. 8 a cross section of the first embodiment;

FIG. 9 a perspective of a second embodiment;

FIG. 10 a perspective of a third embodiment; and

Figure 11:
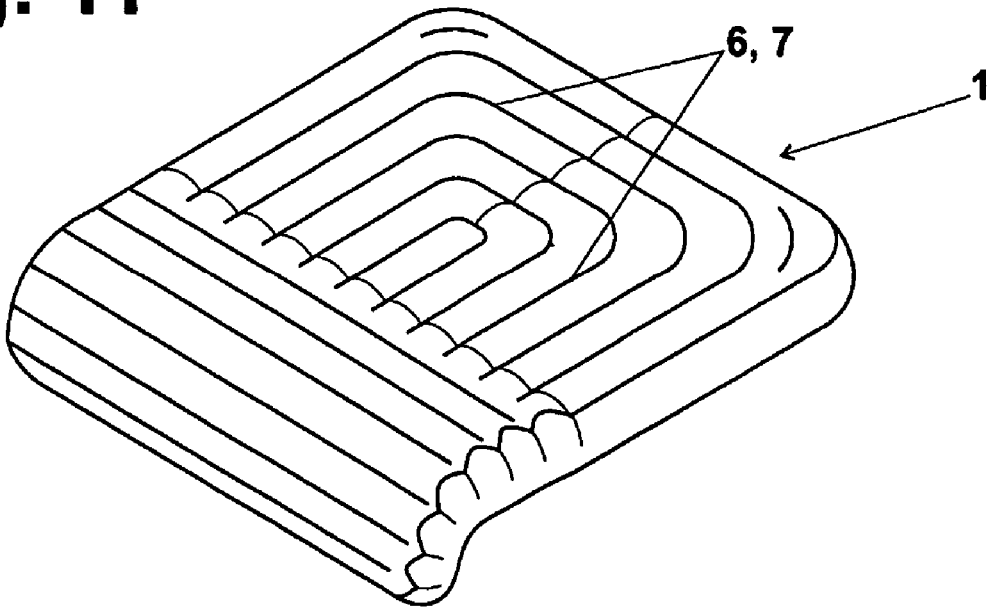

FIG. 11 a perspective of a fourth embodiment.

FIG. 1 shows a perspective view of a first embodiment of a seat cushion and backrest cushion according to the invention, in this instance of a simple design, for example for a means of mass transportation. The cushion is divided into a seat cushion 1 and a backrest cushion 2. These can be individual units or joined. Any seat cover that may be used has been removed. Also not shown is the actual seat structure because it forms part of the state of the art and does not form part of the subject matter of the invention.

FIG. 2 shows a section AA of the seat cushion 1 and diagrammatically shows the interior structure of said seat cushion 1: it comprises a shell 3, structured into an upper skin 4 and a lower skin 5. Two types of webs, namely single webs 6 and double webs 7 extend between the upper skin 4 and the lower skin 5. As the number of double webs 7 increases, so does the degree of adaptability, as will be further explained with reference to FIGS. 3 and 4.

The webs 6, 7, are connected to the upper skin 4 and lower skin 5 by gluing or welding. Both the shell 3 and the webs 6, 7 are made of a gas-proof material, such as a plastic foil of suitable strength or a plastics-coated fabric. With a view to safety, preferably non-combustible textiles and/or textiles with a flame-retardant finish are used.

In the section according to FIG. 2, seat and backrest cushions 1, 2 are connected by a tape 8, preferably a textile tape 8.

In the context of the invention, the designs shown in FIGS. 2, 3, 4 and 5 apply both to cushion 1 and 2.

Figure 3:
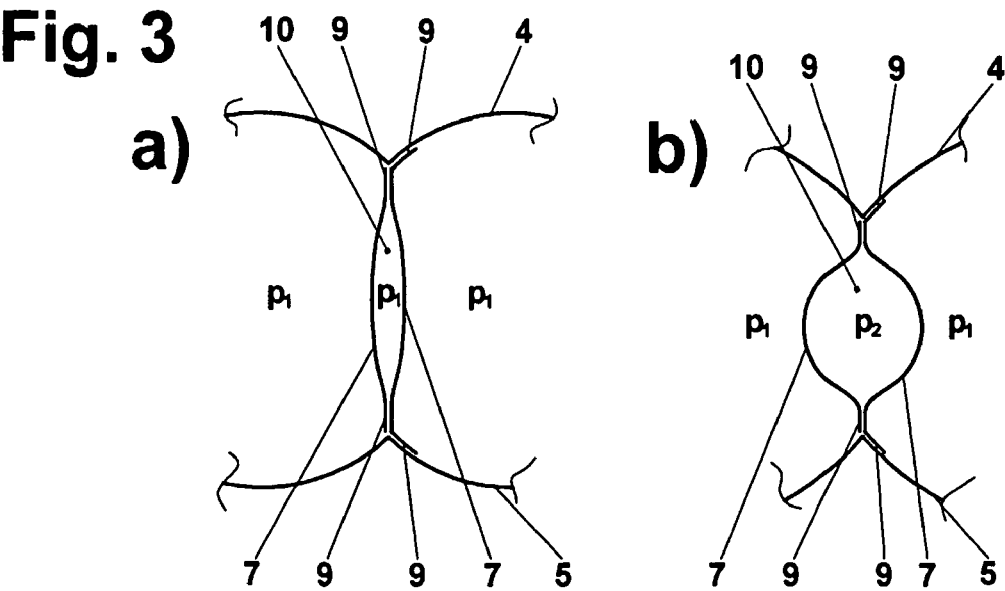

As shown, the single webs 6 are connected to the upper skin 4 and lower skin 5 along a strip 9. In the double webs 7 there are two embodiments, as shown in FIGS. 3 and 4; with the view shown in FIG. 2 corresponding to that of FIG. 3. In this first embodiment, one web 7 is connected to the shell 3 as explained in the description of the single webs 6. The second web 7 is again connected to the first web 7 along two strips 9. A cavity 10 which results from this is sealed-off in an airtight manner from the remaining interior of the seat cushion 1. In the two embodiment variants, the supply of compressed air and de-aeration take place by way of a hose which is arranged in the interior of the seat 1, wherein said hose comprises a branch at each pair or at selected pairs of webs. Of course it is also possible for each cavity 10 to have its own supply of compressed air. A second way of supplying air to the double webs is explained in more detail with reference to FIG. 6.

FIG. 5 shows a second form of double webs 7. Along two strips 9, the double webs 7 are interconnected once more so that two cavities 10 are formed. Webs 7 comprising three or more cavities also are in accordance with the invention.

In the interior of the cushion 1 the air pressure is $p_1$. By way of air lines, which will be described in detail below, air is supplied to the spaces between the double webs 7. If their pressure $p_2$ exceeds $p_1$, the webs 7 become curved and their shape changes from that shown in FIG. 3*a*, FIG. 4*a* and FIG. 5*a* to that according to FIG. 3*b*, FIG. 4*b* and FIG. 5*b*. In other words, between the webs 7 the cavities 10 are formed whose height decreases as the overpressure $\Delta p = p_2 - p_1$. In this way, the shape of the seat cushion 1 can be changed. If double webs 7 are arranged above all in the rear part of the seat cushion 1, then its inclination can be varied. Further variation options are explained in the context of the description of FIG. 8.

FIGS. 3 and 4 show the different options of connecting the web 7 with the shell 3. In FIG. 3 a web 7 is connected along two strips 9, each with upper and lower skin 4, 5. The second web 7, which is somewhat lower than the first web, is again connected to said first web 7 along two strips 9.

FIG. 4 shows the second variant. In this variant, both webs 7 are each connected to the upper and lower skin in the same way along a strip 9.

From the point of view of manufacture, the first variant according to FIG. 3 is somewhat easier, but the second variant according to FIG. 4 provides more adaptation options.

FIG. 6 shows a step in the production of double webs 7 according to the first variant of FIG. 3. The material for the webs 7 is cut to size, wherein the material for the first web 7 is wider by two strips 9 than the material of the second web 7. Thereafter, two material layers are placed one on top of the other and are welded or glued together along the inner strips 9. Of the larger cutout, on each longitudinal side a strip 9 remains free, which is subsequently glued or welded together with the upper skin 4 and the lower skin 5 respectively.

As shown in FIG. 6, a strip 11 is cut to each web 7. These two strips 11 are also interconnected with each other on the borders, thus forming an air channel 12. A spreader element 13 can be placed in this air channel 12, wherein said spreader element keeps the air channel open even if it is bent.

For the second variant according to FIG. 4, both cutouts for the webs 7 are of identical design, however they are not connected along their longitudinal sides.

If a web which extends crosswise through the entire seat cushion is to made so as to be only partially adaptive, i.e. made with two webs 7, then the procedure shown in FIG. 7 can be applied, in which the cutouts comprise two strips 11 each for the air channels 12, one strip on each side of the cutout. Across the cutouts of the webs 7, for example, two (which is the rule) welded or glued seams 14 are inserted which divide the cutout into three zones: on the outside and adjacent to the air channels 12, i.e. in border regions 15, the webs 7 are adaptive as described so far. Between the welded or glued seams 14, a middle zone 16 is created, in which zone 16 only two webs 6 are arranged side by side. Since no compressed air can get between said two webs 6, this middle zone 16 is not adaptive.

FIG. 8 shows a section BB (according to FIG. 1) of the seat cushion 1 and thus a top view of a double web 7. The webs 6, 7 interconnect the upper skin 4 and the lower skin 5 essentially across the entire width of the seat cushion 1, with the shell 3 being free only in the border regions 17. This is also where pressure compensation within the seat cushion 1 takes place. Preferably the air channels 12 are also arranged in these border regions 17, wherein said air channels 12 exit the seat cushion 1 in the region of its rear end and exit the backrest cushion 2 at its lower region and are then connected to a compressed air control system. The compressed-air inlets for the cushions 1, 2 are also arranged in the above-mentioned regions.

By suitable grouping and combining double webs 7 it is possible according to the invention to make each region of the seat cushion 1 adaptive by using compressed air.

The above description, with reference to FIGS. 2 to 7, relating to the seat cushion 1, of course equally applies to the backrest cushion 2. In backrest cushions 2 it is preferably, but not exclusively, the passenger's lumbar region that is of interest concerning adaptivity. It must be borne in mind that, depending on the stature of passengers, the exact position of the lumbar region differs. A pneumatic control system is tasked with combining, grouping and localising double webs 7. The design of such a control system does not fall within the scope of the invention described in this document.

FIG. 9 shows a second embodiment of seat cushions 1 and backrest cushions 2, wherein the perspective corresponds to that of FIG. 1. The embodiment shown in FIG. 9 has more complex contours when compared to that shown in FIG. 1. These contours can be produced by the way the webs 6, 7 and the shell 3 are cut, without having any influence on the technical contents of the structure shown in FIGS. 2 to 7. Furthermore, the adaptive effect of the double webs 7 can easily be influenced by way of the thickness of the cushions 1, 2 and the design of the double webs 7.

FIG. 10 shows a third embodiment in the shape of a seat cushion 1. In order to further improve the ergonomics, in the region of the buttocks the webs 6, 7 are essentially arranged in the manner of concentric ellipses. In this way, the seat cushion can be designed in the shape of a trough 18. Naturally, ellipse-like air chambers are also created between the ellipse-like webs 6, 7. These air chambers can separately be supplied with compressed air, either individually or in groups, which makes it possible to select the hardness of the cushion 1 in the buttock region. If the webs 6, 7, which are arranged in a concentric ellipse-like manner, are entirely or partly designed as double webs 7, additionally the form of the trough 18 is changeable and adjustable.

FIG. 11 shows a fourth embodiment, also in the shape of a seat cushion 1. In order to obtain an ergonomic shape, several U-shaped webs 6, 7 were integrated in the cushion in the region of the buttocks and the thighs. The U-shape essentially corresponds to the seat-engaging area of a seated person. If the U-shaped webs 6, 7 are designed as double webs 7, with this measure, the seat-engaging area taken up on the seat cushion 1 by a person can in a simple way be designed so as to be adaptive.

Attaching the seat cushion 1 and the backrest cushion 2 in a given seat structure or seat shell preferably takes place by two or more adherence-type closure strips which can be attached to the lower skin 5 and to the seat structure by way of adhesion. Other ways of attaching the cushions 1, 2, such as for example by clamps or buttons, also fall within the scope of this invention.

The invention claimed is:

1. An adaptive pneumatic seat cushion and backrest cushion for vehicles and aeroplanes, comprising:
    a seat cushion and a backrest cushion which can be connected;
    the seat cushion and the backrest cushion further comprises:
        an airtight shell filled with compressed air, wherein said shell is divided into an upper skin and a lower skin;
        a plurality of webs arranged between the upper skin and the lower skin, wherein said plurality of webs are adapted to connect the upper skin and the lower skin;
        wherein the plurality of webs include first webs which are single webs and second webs which are double webs so that in each case at least one cavity is formed between at least two of the plurality of webs;
        wherein the at least one cavity is closed off from its surroundings in an airtight manner, except for an aperture for letting compressed air in or out;
        an interior of the shell can be filled with compressed air at a first pressure level $p_1$;
        the cavities can be pressurised at a second pressure level $p_2$; and
        wherein said second pressure level $p_2$ is greater than said first pressure level $p_1$.

2. The adaptive pneumatic seat cushion and backrest cushion according claim 1, wherein all connections between the plurality of webs and the shell are produced by an application of adhesive;
    wherein the latter is divided into the upper and the lower skin; and
    wherein the double webs between themselves and cutouts for air channels are produced by the application of the adhesive.

3. The adaptive pneumatic seat cushion and backrest cushion according to claim 1, wherein all connections between the plurality of webs and the shell are produced by way of welding;
    wherein the latter is divided into the upper and the lower skin; and
    wherein the of double webs between themselves and cutouts for air channels are produced by way of welding.

4. The adaptive pneumatic seat cushion and backrest cushion according to claim 1, wherein each of the cavities between the double webs can individually be supplied with said compressed air.

5. The adaptive pneumatic seat cushion and backrest cushion according to claim 1, wherein the cavities between the double webs can be selectively grouped together and be supplied with said compressed air.

6. The adaptive pneumatic seat cushion and backrest cushion according to claim 1, wherein the shell, the plurality of webs and cutouts for air channels are formed from plastic.

7. The adaptive pneumatic seat cushion and backrest cushion according to claim 1, wherein the shell, the plurality of webs and cutouts for air channels are formed from a plastics-coated textile material.

8. The adaptive pneumatic seat cushion and backrest cushion according to claim 1, wherein said seat cushion and said backrest cushion can be attached to a seat structure by way of adherence-type closures which are attached to the seat structure and to the seat cushion and backrest cushion by gluing.

9. The adaptive pneumatic seat cushion and backrest cushion according to claim 1, wherein:
  cutouts of said double web are designed such that said cutouts are identical;
  wherein said cutouts are directly adjacent to each other along a strip and are each connected to the upper skin and the lower skin; and
  wherein narrow sides of said double webs are interconnected along said strip such that the cavity between the double webs is closed off by a plurality of connections along the strips.

10. The adaptive pneumatic seat cushion and backrest cushion according to claim 9, wherein at least on one end, a plurality of strips are cut to the cutouts for the double webs, wherein said plurality of strips are interconnected by their borders, form air channels for filling the cavities with said compressed air.

11. The adaptive pneumatic seat cushion and backrest cushion according to claim 10, wherein spreader elements are inserted into the air channels, wherein said spreader elements prevent the air channels from becoming closed off due to kinking.

12. The adaptive pneumatic seat cushion and backrest cushion according to claim 1, wherein:
  the double webs further include a first web and a second web;
  wherein the first web is connected to the second web along two strips, wherein a width of said first web is narrower than a width of the second web by an amount which corresponds to a width of said two strips;
  wherein the second web is connected both to the upper skin and the lower skin of the shell along the two strips; and
  wherein narrow sides of the double webs each are interconnected along a strip of the two strips so that the cavity (10) between the double webs is closed off by a plurality of connections along the two strips.

13. The adaptive pneumatic seat cushion and backrest cushion according to claim 12, wherein the double webs are interconnected at least once more along said two strips such that at least two cavities are formed.

14. The adaptive pneumatic seat cushion and backrest cushion according to claim 12, wherein in selected pairs of said double webs, two connecting positions are provided across a longitudinal extension of said double webs, wherein said connecting positions extend along an entire height of the double webs defining two border zones each and a middle zone of the cavities, wherein the border zones are adapted to be filled with said compressed air, and the middle zone is closed off from any supply of said compressed air.

15. The adaptive pneumatic seat cushion and backrest cushion according to claim 14, wherein at least one of said two connecting positions includes a welding position.

16. The adaptive pneumatic seat cushion and backrest cushion according to claim 14, wherein at least one of said two connecting positions includes a gluing position.

* * * * *